United States Patent [19] [11] 4,131,838
Etoh et al. [45] Dec. 26, 1978

[54] DISPLACEMENT AMOUNT DETECTING DEVICE

[75] Inventors: Kunihiko Etoh, Toyota; Katsumi Sugiura, Takahama, both of Japan

[73] Assignee: Toyoda-Koki Kabushiki-Kaisha, Aichi, Japan

[21] Appl. No.: 823,023

[22] Filed: Aug. 9, 1977

[30] Foreign Application Priority Data

Sep. 28, 1976 [JP] Japan ................................ 51-116713

[51] Int. Cl.$^2$ ............................................ G05B 19/28
[52] U.S. Cl. .................................... 318/603; 318/608; 318/681
[58] Field of Search ......................... 318/603, 608, 681

[56] References Cited

U.S. PATENT DOCUMENTS 3,562,619 2/1971 Hyoguchi ............................. 318/603
4,023,085 5/1977 Bishop et al. ....................... 318/603 X Primary Examiner—B. Dobeck
Attorney, Agent, or Firm—Oblon, Fisher, Spivak, McClelland & Maier

[57] ABSTRACT

A device which detects the amount of displacement of a movable member moved by a feed device, and which outputs pulse signals corresponding to the amount of such displacement. The displacement amount detecting device includes a reference pulse generator for generating a train of reference pulses at a predetermined frequency, a carrier counter which counts the reference pulses from the pulse generator and outputs carrier signals, a dummy counter which counts the reference pulses from the pulse generator and which outputs a dummy signal, a transducer which receives the carrier signals and which generates a phase modulation signal proportional to the amount of displacement, a phase comparator which compares the modulation signal with the dummy signal and which outputs a first gate signal while the phase of the modulation signal leads the phase of the dummy signal and a second gate signal while the phase of the modulation signal lags the phase of the dummy signal, and input and output gating circuitry resonsive to the first and second gate signals. The input gating circuitry interrupts transmission of the reference pulses to the carrier counter while receiving the first gate signal and interrupts transmission of the reference pulses to the dummy counter while receiving the second gate signal. Such interruption is continued until the phase of the modulation signal coincides with that of the dummy signal, so that the reference pulses output from the output gating circuitry during such interruption correspond to the displacement amount of the movable member.

7 Claims, 4 Drawing Figures

DISPLACEMENT AMOUNT DETECTING DEVICE

BACKGROUND OF THE INVENTION

Field of the Invention

This invention relates generally to a device for detecting a displacement amount of a movable member, and particularly to a displacement amount detecting device which outputs pulse signals corresponding to such a displacement amount.

Description of the Prior Art

Heretofore, a displacement amount detecting device of a similar type has been known in which a displacement-phase transducer such as, for example, a resolver or a magnetic scale, is used to transduce a displacement amount of a movable member to a phase angle. The converted phase angle is then converted to pulses of the number corresponding thereto, and the number of the pulses which are converted during predetermined periods of time different from each other are successively compared so as to output an increment of the pulse number as a displacement amount of the movable member.

However, in this displacement amount detecting devices, there is necessitated a memory circuit for storing the number of pulses converted during the previous period of time and an arithmetic circuit for comparing the stored number of pulses with the number of pulses converted during the following period of time so as to output pulses of the number corresponding to the difference therebetween. In addition, a control circuit is necessitated to cause the memory circuit and the arithmetic circuit to so operate within a predetermined interval of time. As a result, this displacement amount detecting device is structurally complicated and is also expensive.

SUMMARY OF THE INVENTION

It is therefore an object of the present invention to provide an improved displacement amount detecting device which is easily constructed and is also highly precise.

Another object of the present invention is to provide an improved displacement amount detecting device wherein feedback pulses are generated when the phase of an output signal from a displacement-phase transducer is inconsistent with the phase of a dummy signal.

A further object of the present invention is to provide a displacement amount detecting device of the character set forth above wherein both of the phase of a dummy signal and of carrier signals to a displacement-phase transducer are controlled to cause the phase of an output signal from the transducer to coincide with the phase of the dummy signal.

Briefly, these and other objects of this invention are achieved by providing a displacement amount detecting device, which includes a reference pulse generator for generating a train of reference pulses at a predetermined frequency, a carrier counter which counts the reference pulses from the pulse generator and which outputs carrier signals, a dummy counter which counts the reference pulses from the pulse generator and which outputs a dummy signal, a transducer which receives the carrier signals and generates a phase modulation signal proportional to the amount of displacement, a phase comparator which compares the modulation signal with the dummy signal and which outputs a first gate signal while the phase of the modulation signal leads the phase of the dummy signal and a second gate signal while the phase of the modulation signal lags the phase of the dummy signal, and input and output gating circuitry responsive to the first and second gate signals. The input gating circuitry interrupts transmission of the reference pulses to the carrier counter while receiving the first gate signal and interrupts transmission of the reference pulses to the dummy counter while receiving the second gate signal. Such interruption is continued until the phase of the modulation signal coincides with that of the dummy signal, so that the reference pulses output from the output gating circuitry during such interruption correspond to the displacement amount of the movable member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
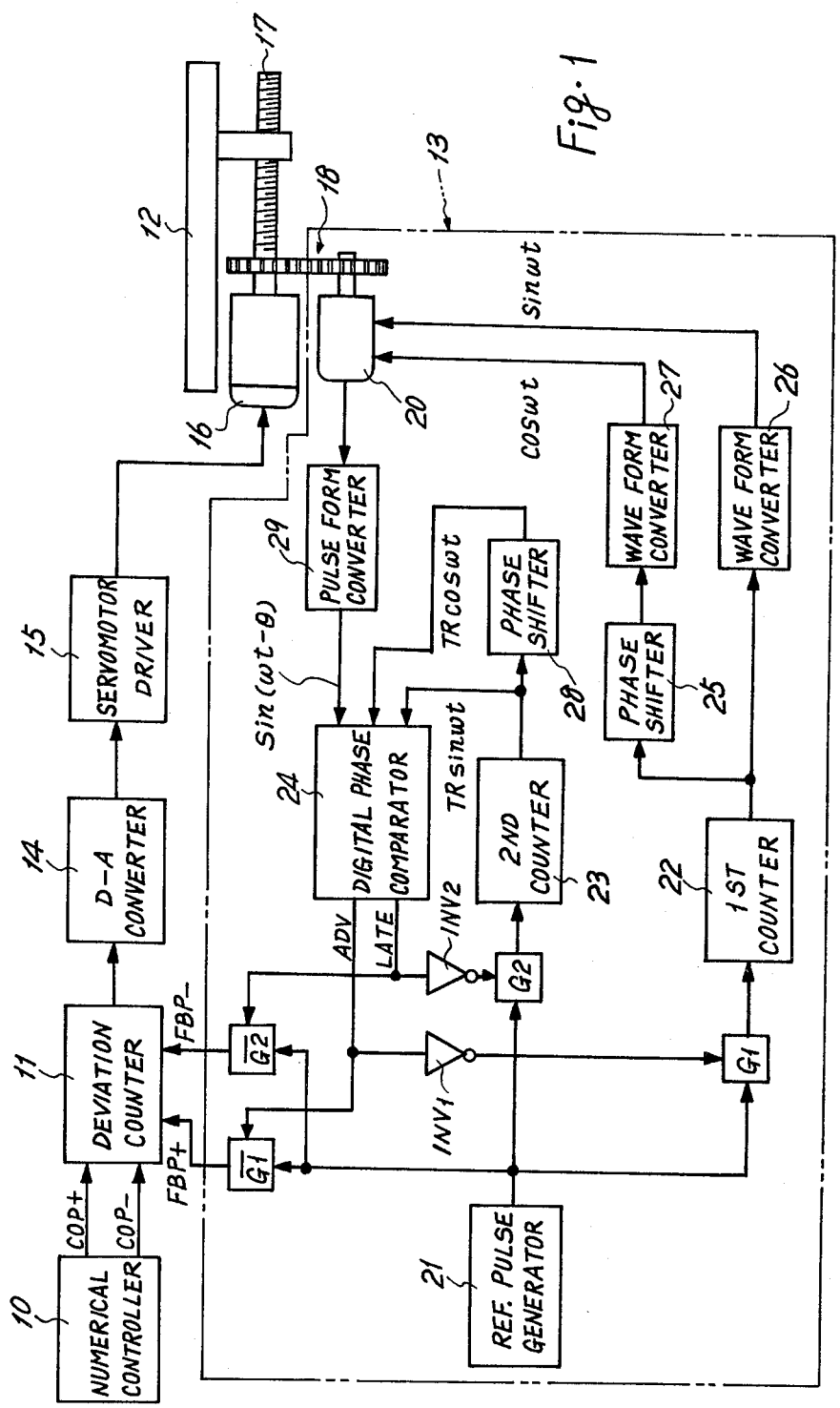
FIG. 1 is a block diagram of a displacement amount detecting device according to the present invention.

Referring now to the drawings, wherein like reference numerals designate identical or corresponding parts throughout the several views, and more particularly to FIG. 1 thereof, reference numeral 10 denotes a numerical controller which is connected to a deviation counter 11 so as to supply thereto a train of distribution pulses, whose number and frequency correspond respectively to feed amount and feed rate information contained in numerical control data. The deviation counter 11 is a conventional up-down counter and calculates the difference between the distribution pulses and feedback pulses, which are generated from the displacement amount detecting device 13 of the present invention in corresponding to a displacement amount of a slide member 12. A digital to analog converter 14 is connected between the deviation counter 11 and a servomotor drive device 15 and converts the calculated difference to an analog signal so as to input the same to the drive device 15. A servomotor 16 is connected with the drive device 15 and, when receiving the analog signal, rotates at a speed corresponding to the difference, whereby the slide member 12 is moved through a feed screw 17 connected with the servomotor 16.

In order to detect a displacement amount of the slide member 12, a resolver 20 constituting the displacement amount detecting device 13 is provided. The resolver 20 is drivingly connected with the servomotor 16 through a gear train 18. This resolver 20 outputs a phase modulation signal with a phase sin ($\omega t - \theta$) corresponding to an absolute rotational angle $\theta$ of the rotor thereof when receiving at its stator coils sine and cosine carriers (sin $\omega t$, cos$\omega t$) whose phases differ from each other by an angle of 90°. Therefore, when advancement of the slide member 12 effects rotation of the resolver 20 in one direction, resolver 20 outputs a phase modulation signal with a phase corresponding to the displacement amount of the slide member 12.

A circuit which constitutes the displacement amount detecting device 13 together with the resolver 20, primarily comprises a reference pulse generator 21, a first counter 22, a second counter 23, a digital phase comparator 24 and first and second input gates G1, G2. The reference pulse generator 21 is connected with the first and second counters 22, 23 via the first and second gates G1, G2 and supplies a train of reference pulses as shown in (a) of FIG. 2 to both the counters 22 and 23. This first up-counter 22 constitutes a first counting means together with a phase shifter 25 and, by counting divides the reference pulses supplied via the first gate G1 so as to output such a sine carrier sin $\omega t$ as shown in (b) of FIG. 2. Connected with the first counter 22 is the phase shifter 25, which advances the phase of the sine carrier sin $\omega t$ through an angle of 90°, and therefore outputs a cosine carrier cos $\omega t$. Further, wave form converters 26 and 27 are respectively connected between the first counter 22 and the phase shifter 25 and the resolver 20 so as to convert the carriers sin $\omega t$ and cos $\omega t$ respectively to ordinary or true alternative waves. Accordingly, upon receipt of the true sine and cosine carriers (sin $\omega t$, cos $\omega t$) at the stator coils, the resolver 20 outputs a phase modulation signal sin ($\omega t-\theta$) (hereinafter called "S") to a pulse form converter 29 connected thereto. This converter 29 has its output terminal connected to the digital phase comparator 24 and serves to convert the modulation signal S to a rectangular wave signal available for the comparator 24.

By way of example, in this instant embodiment, the frequency of the reference pulse generator 21 is set to 4000kHz, and the first counter 22 has its counting capacity of 4k, so that sine and cosine carriers (sin $\omega t$; cos $\omega t$) of approximate 1kHz are applied to the resolver 20. In other words, the rotational phase of the rotor of the resolver 20 is scanned or inspected at the frequency of approximate 1kHz. Furthermore, the rotor of the resolver 20 is connected to rotate at a speed of 166.66 . . . r.p.m. when the slide member 12 is moved at its maximum feed rate, for example, 10 m/min. and therefore, it is to be noted that a displacement angle through which the rotor of the resolver 20 rotates during a period of time between a certain inspection and the next inspection does not exceed more than approximately 60° even when the slide member 12 is moved at such a maximum feed rate.

Figure 2:
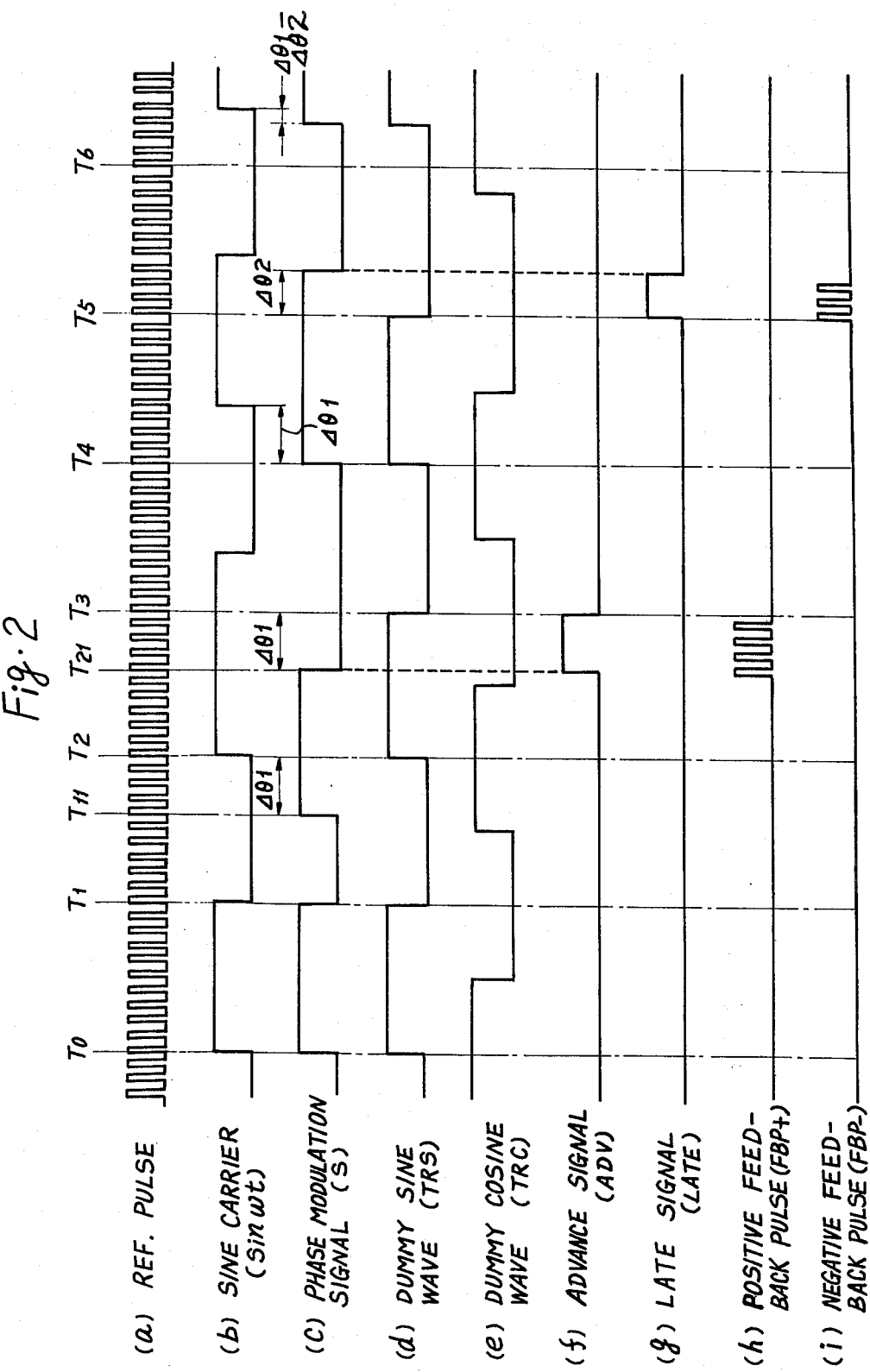
FIG. 2 is a time chart for explaining the operation of the displacement amounts detecting device.

The second counter 23 constitutes a second counting means together with another phase shifter 28 and is an up-counter which has the same counting capacity as that of the first counter 22. This second counter 23 counts the reference clock pulses supplied via the second input gate G2 and outputs a dummy sine wave TR sin $\omega t$ (hereinafter called "TRS") as shown in (d) of FIG. 2. The phase shifter 28 is connected to the second counter 23 to receive the dummy sine wave TRS and advances the same an angle of 90°. Therefore, a dummy cosine wave TRcos $\omega t$ (hereinafter called "TRC") as shown in (e) of FIG. 2 is output from the phase shifter 28. The outputs of the second counter 23 and the phase shifter 28 are connected to the digital phase comparator 24 so as to input the dummy waves TRS and TRC thereto.

Figure 3:
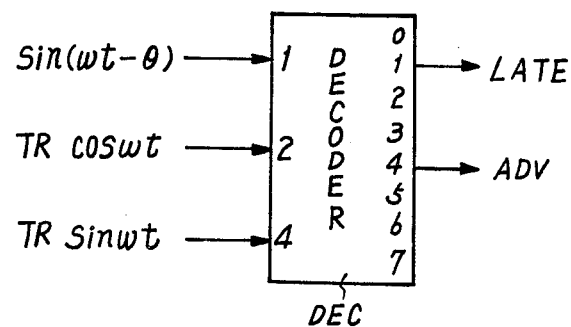
FIG. 3 is illustrative of an embodiment of the digital phase comparator in FIG. 1.

The digital phase comparator 24 is connected at another input terminal thereof to the pulse form converter 29 so as to receive the phase modulation signal S. The phase comparator 24 compares the phase of the phase modulation signal S with that of the dummy sine wave TRS, under the condition that the dummy waves TRS and TRC input from the second counting means and the modulation signal S input from the pulse form converter 29 are ANDed. The phase comparator 24 is further arranged to output an advance signal ADV while the phase of the modulation signal S leads the phase of the dummy wave TRS, and also to output a late signal LATE while the phase of the modulation signal S lags the phase of the dummy wave TRS. For example, in case that the phase comparison is carried out at the time of the phase modulation signal S dropping, the advance signal ADV is active while a condition of $\overline{S}\cdot TRS \cdot \overline{TRC}$ is satisfied, and the late signal LATE is active while a condition of $S \cdot \overline{TRS} \cdot \overline{TRC}$ is satisfied. Such logical operations are easily performed using a binary to decimal decoder DEC as shown in FIG. 3. The advance output ADV of phase comparator 24 is connected to the first input gate G1 via an inverter INV1 as well as to a first output gate G1. The LATE output of the phase comparator 24 is connected to the second input gate G2 via another inverter INV2 as well as to a second output gate $\overline{G2}$ so as to input the late signal LATE thereto.

Accordingly, when the rotor of the resolver 20 is rotated in one direction, the phase of the modulation signal S advances relative to that of the dummy sine wave TRS and therefore, the modulation signal S drops prior to the dummy sine wave TRS. In this event, if the advancement of the phase of the modulation signal S is within an angle of 90°, the condition of $\overline{S}\cdot TRS \cdot \overline{TRC}$ is satisfied, so that the advance signal ADV is output. Since the first input gate G1 is thus closed, the first counter 22 stops counting so as to lock the phase of the modulation signal S. However, while the first counter 22 stops counting, the second counter 23 further counts the reference pulses, and when the count-up of the second counter 23 causes the dummy sine wave TRS to drop the coincidence of the phase is detected and the output of the advance signal ADV is discontinued. The advance signal ADV is connected also to the first output gate $\overline{G1}$, as mentioned previously, and therefore, while receiving the advance signal ADV, the output gate $\overline{G1}$ is opened, whereby reference pulses, whose number corresponds to the phase difference or the rotational amount of the resolver 20, are input as positive feedback pulses FBP+ to the deviation counter 11.

On the other hand, when the rotor of the resolver 20 is rotated in the other direction, the phase of the modulation signal S lags that of the dummy sine wave TRS and the same drops early. In this event, the condition of $S \cdot \overline{TRS} \cdot \overline{TRC}$ is satisfied, and the late signal LATE is output. Thus, transmission of the reference pulses to the second counter 23 is interrupted, and until the coincidence of the phases is brought about, the second counter 23 stops counting. The reference pulses generated during this period of time are input as the negative feedback pulses FB- to the deviation counter 11 via the second output gate $\overline{G2}$.

The operation of the displacement amount detecting device 13 as constructed above will be described by reference to the time chart shown in FIG. 2. Assuming now that the detection of displacement amount is initiated at the time of T0 after resetting of the first and second counters 22, 23, the phases of the modulation signal S and the dummy sine wave TRS in this time are in coincidence with each other, and neither the advance signal ADV nor the late signal LATE is output from the phase comparator 24. The first and second counters 22, 23 then receive the reference pulses through the first and second input gates G1, G2 and at the same time, initiate counting. Consequently, the sine carrier sin ωt is output from the wave form converter 26 and, together with the cosine carrier cos ωt from the waveform converter 27, is applied to the resolver 20.

In addition to this, the second counter 23 outputs the dummy sine wave TRS which, together with the dummy cosine wave TRC advanced by the phase shifter 28, is applied to the phase comparator 24. In this event, if it is assumed that the rotor of the resolver 20 is being stopped at the original position, namely it is being stopped with the absolute rotational angle θ being zero degree, the phase of the modulation signal S coincides with that of the sine carrier sin ωt, so that the sine carrier sin ωt, the modulation signal S and the dummy sine wave TRS simultaneously drop at the time of T1. Accordingly, neither the advance signal ADV nor the late signal LATE is output from the phase comparator 24, and the first and second input gates G1, G2 are not closed. Further, as the output gates $\overline{G1}$ and $\overline{G2}$ remain closed, no feedback pulses FBP are input to the deviation counter 11.

Assuming next that the rotor of the resolver 20 rotates by an angle of Δθ1 in one direction while time goes from T1 to T11, the phase of the modulation signal S also advances relative to that of dummy sine wave TRS by an angle corresponding to the rotational angle of Δθ1. Thus, a condition of $\overline{S}\cdot TRS\cdot \overline{TRC}$ is satisfied at the time of T21, since the modulation signal S drops prior to the dummy sine wave TRS. The phase comparator 24 outputs the advance signal ADV as shown in (f) of FIG. 2 to thereby close the first input gate G1. At the same time, the output gate $\overline{G1}$ is opened, so that the reference pulses as the positive feedback pulses FBP+ are input to the deviation counter 11, as shown in (h) of FIG. 2. The closing of the first input gate G1 causes the first counter 22 to stop its counting, and only the second counter 23 advances its content one by one. Thereafter, when receiving from the reference pulse generator 21 reference pulses whose number corresponds to the rotational angle of Δθ1, that is at the time of T3, the second counter 23 is counted up, whereupon the dummy sine wave TRS also drops. Namely, at the time of T3, coincidence takes place between the phases of the dummy sine wave TRS and the modulation signal S. In consequence, the output of the advance signal ADV is discontinued. This effects closing the first output gate $\overline{G1}$, which thus stops outputting the positive feedback pulses FBP+ to the deviation counter 11. Simultaneously with this, the first input gate G1 is opened to allow the first counter 22 to again initiate counting.

In this manner, where the phase of the phase modulation signal S leads that of the dummy sine wave TRS, the counting of the first counter 22 is interrupted until the phases of the both coincide with each other, and the reference pulses generated during such an interruption are input as the positive feedback pulses FBP+, to the deviation counter 11. Accordingly, the number of positive feedback pulses is proportional to the phase difference between the modulation signal S and the dummy since wave TRS during the period of one cycle of the modulation signal S, or in other words, it is proportional to the rotational angle Δθ1 through which the rotor of the resolver 20 rotates during the period of one cycle of the modulation signal S.

Assuming further that the rotor of the resolver 20 which is in such a condition as to have rotated by the angle Δθ1 in the one direction, then rotates by a rotational angle Δθ2 in the other direction during the period of time between T4 and T5, the phase of the modulation signal S then lags that of the dummy sine wave TRS by an angle corresponding to the rotational angle Δθ2, regardless of the last rotational angle Δθ1 of the resolver 20. For this reason, at the time of T5, the modulation signal S does not drop, but the dummy sine wave drops. Therefore, at the time of T5, the condition of $S\cdot \overline{TRS}\cdot \overline{TRC}$ is satisfied and the late signal LATE is issued from the phase comparator 24. Upon receipt of the late signal LATE, the second output gate $\overline{G2}$ is opened to thereby output the reference pulses as the negative feedback pulses FBP- to the deviation counter 11. At the same time, the second input gate G2 is closed to interrupt the counting of the second counter 23 until the phase of the modulation signal S coincides with that of the dummy sine wave TRS.

When the subsequent count-up of the first counter 22 results in dropping the modulation signal S, the output of the late signal LATE is discontinued to again close the output gate $\overline{G2}$, and this interrupts transmitting the negative feedback pulses FBP- to the deviation counter 11. Additionally, the second input gage G2 is again opened to allow the second counter 23 to again initiate counting. In this manner, where the phase of the modulation signal S lags that of the dummy sine wave TRS, the counting of the second counter 23 is interrupted, unlike in the first described case, until the phases coincide. The number of reference pulses which are generated during this interruption corresponds to the rotational angle- Δθ2 through which the resolver 20 rotates during the period of one cycle of the modulation signal S, and are applied as the negative feedback input pulses FBP- to the deviation counter 11.

Although the phase comparison in the foregoing embodiment is carried out at the dropping of the modulation signal S, it is to be noted that such phase comparison can otherwise be carried out at the rising of the modulation signal S. In that case, substantially the same operation is achieved if the advance signal ADV is issued when the condition of $S\cdot \overline{TRS}\cdot TRC$ is satisfied and if the late signal LATE is issued when the condition of $\overline{S}\cdot TRS\cdot TRC$ is satisfied. Accordingly, a signal output from an output terminal 3 of the decoder DEC illustrated in FIG. 3 can be used as the advance signal ADV, and another signal output from another output terminal 6 can be used as the late signal LATE.

Figure 4:
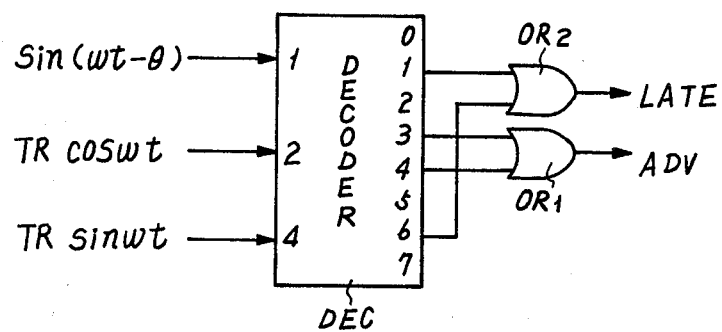
FIG. 4 is illustrative of another embodiment of the digital phase comparator in FIG. 1.

Furthermore, it is also possible to perform the phase comparison at both the rising and dropping of the modulation signal S. In such an embodiment the advance signal ADV has to be issued under the condition of $S\cdot \overline{TRS}\cdot TRC + \overline{S}\cdot TRS\cdot \overline{TRC}$, and the late signal LATE has to be issued under the condition of $\overline{S}\cdot TRS\cdot TRC + S\cdot \overline{TRS}\cdot \overline{TRC}$. Accordingly, as illustrated in FIG. 4, an output from an OR gate OR1, whose inputs are connected to the output terminals 3 and 4 of the decoder DEC, is used as the advance signal ADV, and an output from another OR gate OR2, whose inputs are connected to the output terminals 1 and 6 of the decoder DEC, is used as the late signal LATE. In this case, because the phase comparison is carried out each half cycle of the modulation signal S, the feedback pulses are also input to the deviation counter 11 each half cycle and therefore, thereby improving the responsive characteristic of the displacement amount detecting device.

As mentioned previously, in a displacement amount detecting device according to the present invention, there are provided the first counting means for counting the reference pulses to thereby output the carriers and the second counting means for counting the reference pulses to thereby output the dummy wave. The phase of the dummy wave supplied from the second counter means and the phase of the phase modulation signal supplied from the displacement-phase transducer such as a resolver are compared each time of one or half cycle of the phase modulation signal, nd the phases of the dummy wave and the modulation signal are controlled to coincide with each other. Accordingly, it is possible to utilize as a displacement amount of the slide member reference pulses, which are generated until coincidence is taken place between the phases, without modification of the reference pulses, so that highly precise detection of displacement amount can be achieved though construction is very simplified.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A displacement amount detecting device for detecting the displacement amount of a movable member by a feed device, comprising in combination:
    a reference pulse generator for gnerating a train of reference pulses at a predetermined frequency,
    first counting means for counting said reference pulses from said reference pulse generator so as to output carrier signals,
    second counting means for counting said reference pulses from said reference pulse generator so as to output a dummy wave,
    a transducer connected with said first counting means for receiving said carrier signals and for generating a phase modulated signal proportional to the displacement of said movable member,
    a phase comparator connected with said second counting means and said transducer for comparing said modulation signal with said dummy wave and adapted to output a first gate signal while the phase of said phase modulated signal leads the phase of said dummy wave and to output a second gate signal while the phase of said phase modulated signal lags the phase of said dummy wave,
    output gate means connected with said reference pulse generator and said phase comparator for applying said reference pulses as output feedback pulses while receiving any one of said first and second gate signals, and
    input gate means connected with said reference pulse generator and said first and second counting means for interrupting transmission of said reference pulses to said first counting means while receiving said first gate signal and for interrupting transmission of said reference pulses to said second counting means while receiving said second gate signal.

2. A displacement amount detecting device as claimed in claim 1, wherein said transducer comprises:
    a resolver whose input shaft is rotatable in proportion to movement of said movable member.

3. A displacement amount detecting device as claimed in claim 2 wherein said first counting means comprises:
    an up-counter for receiving said reference pulses via said input gate means so as to output divided frequency pulses,
    a phase shifter for shifting the phase of said divided frequency pulses through 90°, and
    wave form converting means for receiving said divided frequency pulses from said up-counter and said phase shifter so as to convert said divided frequency pulses respectively to sine and cosine carriers receivable by said resolver.

4. A displacement amount detecting device as claims in claim 3, wherein:
    pulse form converting means is connected between said resolver and said phase comparator for converting said modulation signal to a rectangular wave.

5. A displacement amount detecting device as claimed in claim 4 wherein said second counting means comprises:
    an up-counter for receiving said reference pulses via said input gate means so as to output a divided frequency dummy wave, and
    a phase shifter for shifting the phase of said divided frequency dummy wave through 90°.

6. A displacement amount detecting device as claimed in claim 5, wherein said phase comparator comprises:
    a binary a decimal converter for comparing the phase of said rectangular wave with that of said divided frequency dummy pulse wave under the condition that said rectangular wave, said divided frequency dummy wave, and said divided and phase-shifted frequency dummy wave are logically ANDed.

7. A displacement amount detecting device as claimed in claim 5, wherein said output gate means comprises:
    a first output gate for applying said reference pulses as output feedback pulses for movement in one direction of said movable member while receiving said first gate signal, and
    a second output gate for applying said reference pulses as output feedback pulses for movement in the other direction of said movalbe member while receiving said second gate signal.

* * * * *